US009963171B2

(12) United States Patent
Nagaosa

(10) Patent No.: US 9,963,171 B2
(45) Date of Patent: May 8, 2018

(54) ELECTRICALLY DRIVEN VEHICLE

(71) Applicant: TOYOTA JIDOSHA KABUSHIKI KAISHA, Toyota-shi, Aichi (JP)

(72) Inventor: Hideo Nagaosa, Toyota (JP)

(73) Assignee: TOYOTA JIDOSHA KABUSHIKI KAISHA, Toyota-shi (JP)

(*) Notice: Subject to any disclaimer, the term of this patent is extended or adjusted under 35 U.S.C. 154(b) by 0 days. days.

(21) Appl. No.: 15/315,834

(22) PCT Filed: Apr. 16, 2015

(86) PCT No.: PCT/JP2015/061740
§ 371 (c)(1),
(2) Date: Dec. 2, 2016

(87) PCT Pub. No.: WO2015/186438
PCT Pub. Date: Dec. 10, 2015

(65) Prior Publication Data
US 2017/0096172 A1    Apr. 6, 2017

(30) Foreign Application Priority Data
Jun. 6, 2014    (JP) .................................. 2014-118021

(51) Int. Cl.
*B62D 21/16*    (2006.01)
*B62D 21/15*    (2006.01)
(Continued)

(52) U.S. Cl.
CPC .......... *B62D 21/16* (2013.01); *B60L 11/1896* (2013.01); *B62D 21/155* (2013.01); *B62D 25/08* (2013.01); *B62D 27/02* (2013.01)

(58) Field of Classification Search
CPC ...... B62D 21/16; B62D 21/15; B62D 21/155; B62D 25/08; B62D 27/02; B60L 11/1896
See application file for complete search history.

(56) References Cited

U.S. PATENT DOCUMENTS 9,079,508 B2 *   7/2015   Naito ....................... B60K 1/04
2012/0028135 A1 * 2/2012   Ohashi .................. B62D 25/20
                                                       429/400
(Continued)

FOREIGN PATENT DOCUMENTS

JP    2004-146303 A    5/2004
JP    2012-016960 A    1/2012
JP    2012-018761 A    1/2012

*Primary Examiner* — James A Shriver, II
*Assistant Examiner* — Brian L Cassidy
(74) *Attorney, Agent, or Firm* — Andrews Kurth Kenyon LLP

(57) ABSTRACT

An electrically driven vehicle comprises: a body frame arranged in a holding compartment formed in front of a passenger compartment; a suspension member fastened to the body frame in the holding compartment through a rear side fastening structure; and a fuel cell stack supported on the suspension member through a rear side mount at a position in front of the rear side fastening structure. When a serious collision occurs, the fuel cell stack moves rearward and strikes the fastening structure whereby the fastening structure breaks and thereby suspension member separates from the body frame and the fuel cell stack moves downward and heads toward the inside of the shelter space between the holding compartment and a road surface.

5 Claims, 7 Drawing Sheets

(51) Int. Cl.
*B62D 25/08* (2006.01)
*B62D 27/02* (2006.01)
*B60L 11/18* (2006.01)

(56) References Cited

U.S. PATENT DOCUMENTS

| | | | |
|---|---|---|---|
| 2012/0049571 A1* | 3/2012 | Katou | B62D 21/155 |
| | | | 296/187.09 |
| 2012/0080251 A1* | 4/2012 | Ohashi | B60K 1/04 |
| | | | 180/65.31 |
| 2013/0008735 A1* | 1/2013 | Hiramatsu | B60K 17/16 |
| | | | 180/291 |
| 2013/0333965 A1* | 12/2013 | Kobayashi | B60L 11/1896 |
| | | | 180/65.31 |
| 2013/0341114 A1* | 12/2013 | Ozawa | B60K 1/04 |
| | | | 180/292 |
| 2014/0070566 A1* | 3/2014 | Ogawa | B62D 25/087 |
| | | | 296/187.11 |
| 2014/0110185 A1* | 4/2014 | Naito | B60L 3/0007 |
| | | | 180/65.31 |
| 2015/0027796 A1* | 1/2015 | Naito | B60K 1/04 |
| | | | 180/65.31 |
| 2015/0083507 A1* | 3/2015 | Keller | B60K 1/04 |
| | | | 180/68.5 |
| 2015/0251560 A1* | 9/2015 | Ishikawa | B62D 21/15 |
| | | | 180/232 |
| 2016/0207571 A1* | 7/2016 | Tanaka | B62D 21/11 |
| 2017/0057550 A1* | 3/2017 | Sasaki | B62D 21/11 |
| 2017/0066479 A1* | 3/2017 | Murata | B60K 1/04 |
| 2017/0096067 A1* | 4/2017 | Murata | B60K 1/04 |

* cited by examiner

ELECTRICALLY DRIVEN VEHICLE

CROSS-REFERENCE TO RELATED APPLICATIONS

This is a national phase application based on the PCT International Patent Application No. PCT/JP2015/061740 filed Apr. 16, 2015, claiming priority to Japanese Patent Application No. 2014-118021 filed Jun. 6, 2014, the entire contents of both of which are incorporated herein by reference.

TECHNICAL FIELD

The present invention relates to an electrically driven vehicle.

BACKGROUND ART

Known in the art is an electrically driven vehicle provided with a fuel cell stack generating electric power by an electrochemical reaction between a fuel gas and an oxidant gas and holding the fuel cell stack in a holding compartment formed at the front side of the passenger compartment in the vehicle length direction (see PLT 1).

CITATION LIST

Patent Literature

PLT 1: Japanese Patent Publication No. 2012-018761A

SUMMARY OF INVENTION

Technical Problem

A fuel cell stack used for an electrically driven vehicle is generally relatively heavy in weight. For this reason, if the electrically driven vehicle of PLT 1 collides with something at its front end part and, due to this, an inward (rearward) collision load acts on the vehicle, the fuel cell stack held in the holding compartment is liable to enter the inside of the passenger compartment. Further, if an electrically driven vehicle holding a fuel cell stack in a holding compartment formed at the rear side of the passenger compartment in the vehicle length direction collides with something at the rear end part and thereby an inward (forward) collision load acts on the vehicle, the fuel cell stack held in the holding compartment is liable to enter the inside of the passenger compartment. In the above-mentioned PLT 1, this problem is not alluded to at all.

Solution to Problem

According to the present invention, there is provided an electrically driven vehicle comprising a body frame arranged in a holding compartment formed at an outside of a passenger compartment in a vehicle length direction, a support frame fastened to the body frame in the holding compartment through a fastening structure, and a fuel cell stack generating electric power by an electrochemical reaction between a fuel gas and oxidant gas, which fuel cell stack supported on the support frame through a plurality of mounts inside of the holding compartment at the outside of the fastening structure in the vehicle length direction, wherein the plurality of mounts include an inside mount supporting a part of the fuel cell stack at the inside in the vehicle length direction, a shelter space in which the fuel cell stack can enter is formed between the passenger compartment and the holding compartment and a road surface, and, at the time of a serious vehicle collision when a collision load applied to the vehicle inward in the vehicle length direction is larger than a preset upper limit value, at least one of the part of the fuel cell stack at the inside in the vehicle length direction and the inside mount is moved inward in the vehicle length direction and strikes the fastening structure whereby the fastening structure breaks and thereby the support frame separates from the body frame and the fuel cell stack moves downward and heads toward the inside of the shelter space.

Advantageous Effect of Invention

It is possible to prevent a fuel cell stack inside a holding compartment from entering inside a passenger compartment at the time of a serious vehicle collision.

DESCRIPTION OF EMBODIMENTS

Figure 1:
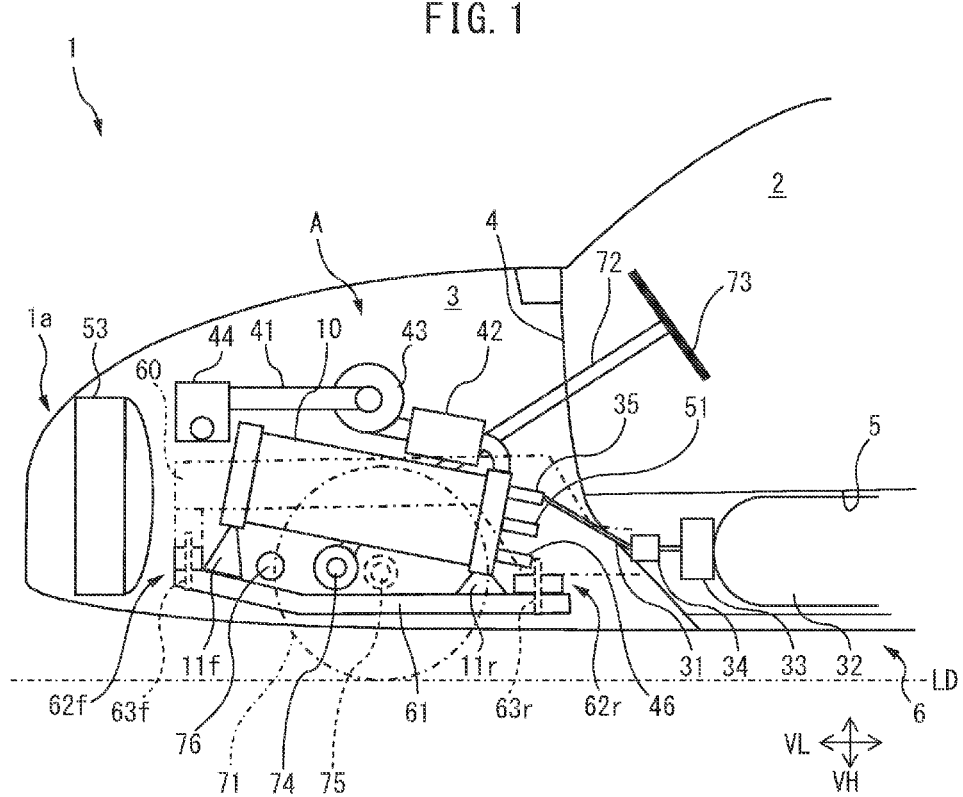
FIG. 1 is a partial side view of an electrically driven vehicle.
Figure 2:
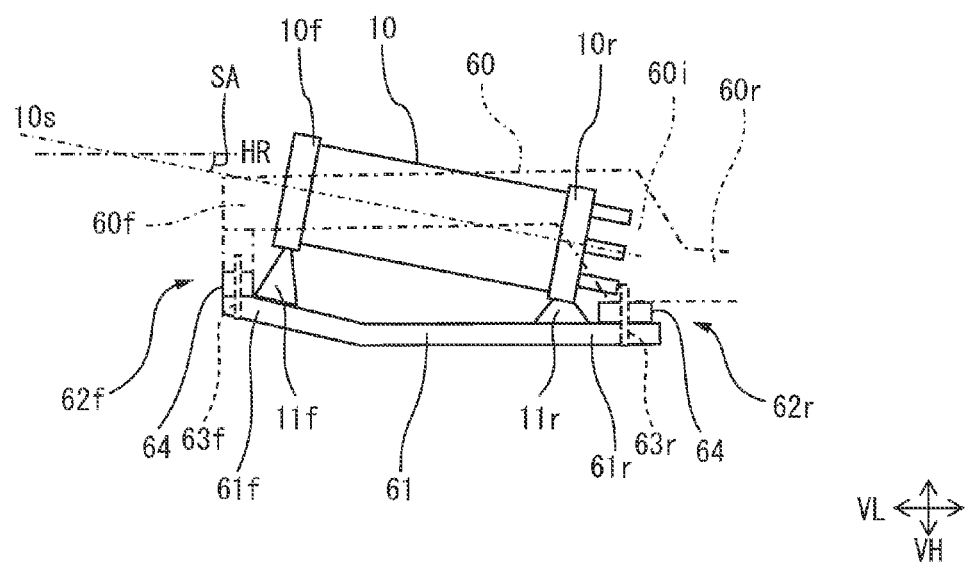
FIG. 2 is a partial side view of a holding compartment of FIG. 1.
Figure 3:
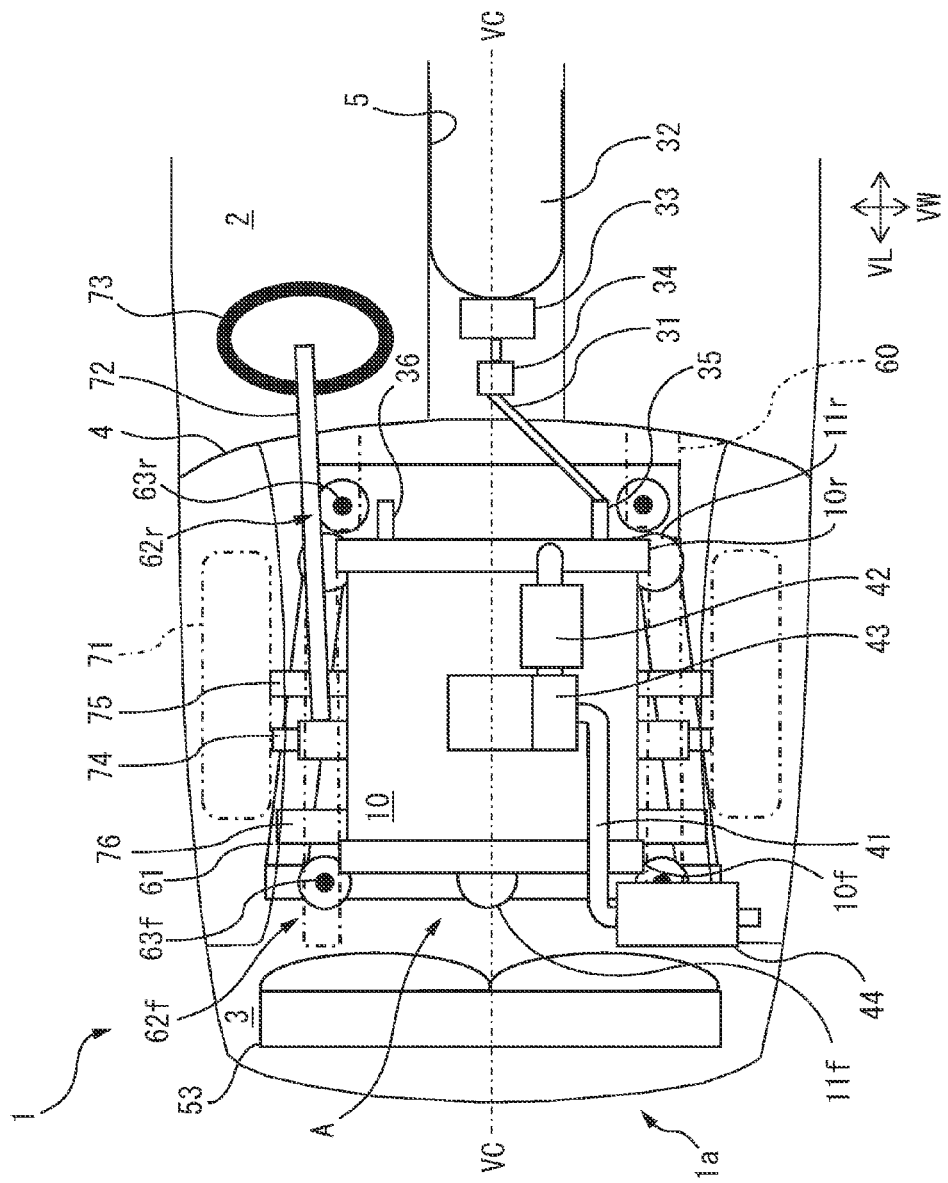
FIG. 3 is a partial plan view of an electrically driven vehicle.

FIG. 1 to FIG. 3 is a partial side view and partial plane view of the electrically driven vehicle. In the drawings, VL indicates the vehicle length direction, VW indicates the vehicle width direction, and VH indicates the vehicle height direction. In this case, the vehicle length direction VL and vehicle width direction VW are horizontal directions, while the vehicle height direction VH is the vertical direction.

Referring to FIG. 1 to FIG. 3, the electrically driven vehicle 1 is provided with a passenger compartment 2 and a holding compartment 3 formed at the outside of the passenger compartment 2 in the vehicle length direction VL, that is, the front side. In the embodiment shown in FIG. 1 to FIG. 3, the holding compartment 3 is separated from the passenger compartment 2 by a dashboard 4. Inside this holding compartment 3, part or all of the fuel cell system A is held.

Figure 4:
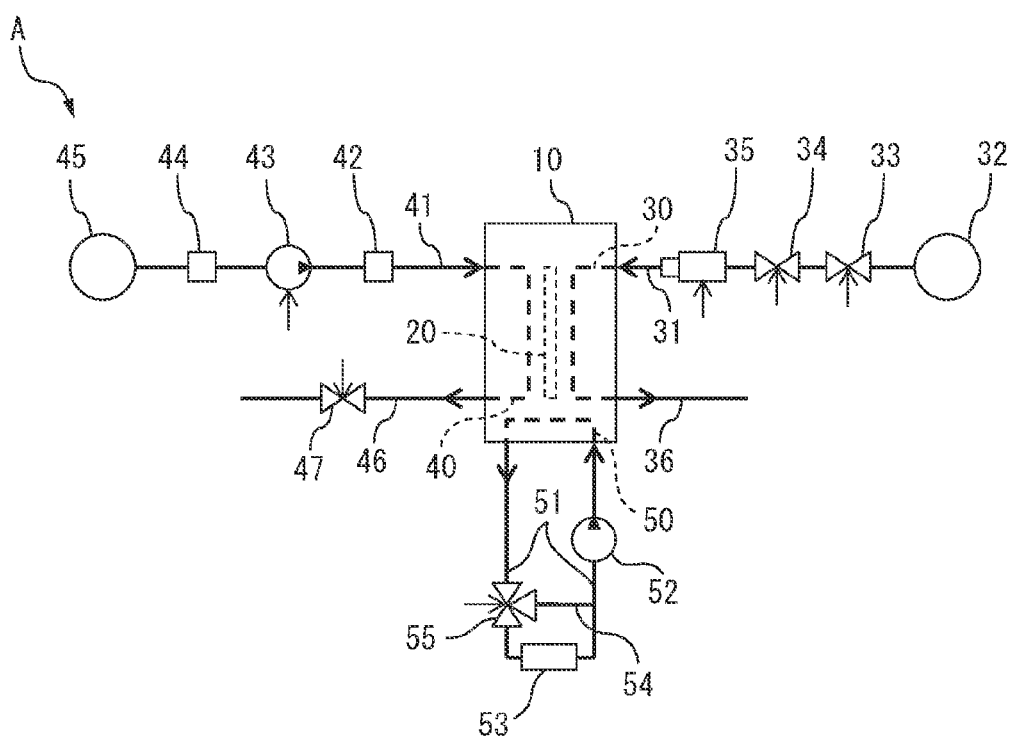
FIG. 4 is a view of the configuration of a fuel cell system.

FIG. 4 is a view of the configuration of the fuel cell system A. A fuel cell stack 10 of the fuel cell system A is provided with a plurality of fuel cell units stacked together along the stacking direction. Each fuel cell unit includes a membrane-electrode assembly 20. The membrane-electrode assembly 20 is provided with a membrane shaped electrolyte, an anode electrode formed at one side of the electrolyte, and a cathode electrode formed at the other side of the electrolyte. Further, inside the fuel cell unit, a hydrogen gas channel for supplying hydrogen gas as a fuel gas to the anode electrode, an air channel for supplying air as an oxidant gas to the cathode electrode, and a cooling water channel for supplying cooling water to the fuel cell unit are formed. By connecting in series the hydrogen gas channels, air channels, and cooling water channels of the plurality of fuel cell units, the fuel cell stack 10 is formed with a hydrogen gas passage 30, air passage 40, and cooling water passage 50.

At the inlet, of the hydrogen gas passage 30, a hydrogen gas feed pipe 31 is connected. The hydrogen gas feed pipe 31 is connected to a hydrogen gas source comprised of a hydrogen tank 32. At the inside of the hydrogen gas feed pipe 31, in order from the upstream side, a main stop valve (shutoff valve) 33, a regulator 34 for regulating the pressure of the hydrogen gas inside the hydrogen gas feed pipe 31, and hydrogen gas injector 35 for supplying the hydrogen gas from the hydrogen tank 32 to the fuel cell stack 10 while adjusting it in amount are arranged. On the other hand, at the outlet of the hydrogen gas passage 30, a hydrogen gas exhaust pipe 36 is connected for taking out the excess hydrogen gas from the fuel cell stack 10. If the main stop valve 33 is opened and the hydrogen gas injector 35 is opened, the hydrogen gas inside the hydrogen tank 32 is supplied to the inside of the hydrogen gas passage 30 inside the fuel cell stack 10 through the hydrogen as feed pipe 31.

Further, at the inlet of the air passage 40, an air feed pipe 41 is connected. The air feed pipe 41 is connected to an air supply comprised of the atmosphere 45. Inside of the air feed pipe 41, in order from the upstream side, an air cleaner 44, air feeder or compressor 43 for supplying air under pressure, and an intercooler 42 for cooling the air sent from the compressor 43 to the fuel cell stack 10 are arranged. On the other hand, at the outlet of the air passage 40, an air exhaust pipe 46 for taking out excess air from the fuel cell stack 10 is connected. If the compressor 43 is driven, air is supplied to the inside of the air passage 40 inside the fuel cell stack 10 through the air feed pipe 41. At the inside of the air exhaust pipe 46, a control valve 47 for controlling the amount of air flowing through the inside of the air exhaust pipe 46 is arranged.

At the inlet, of the cooling water passage 50, one end of a cooling water feed pipe 51 is connected. At the outlet of the cooling water feed pipe 51, the other end of the cooling water feed pipe 51 is connected. At the inside of the cooling water feed pipe 51, a cooling water pump 52 for pumping out cooling water and a radiator 53 are arranged. The cooling water feed pipe 51 upstream of the radiator 53 and the cooling water feed pipe 51 between the radiator 53 and the cooling water pump 52 are connected with each other by a radiator bypass passage 54. If the cooling water pump 52 is driven, the cooling water discharged from the cooling water pump 52 flows through the cooling water feed pipe 51 to the cooling water passage 50 inside of the fuel cell stack 10, then passes through the cooling water passage 50, flows into the cooling water feed pipe 51, and returns through the radiator 53 or radiator bypass passage 54 to the cooling water pump 52.

Referring again to FIG. 1 to FIG. 3, inside of the holding compartment 3, the body frame 60 is arranged at the two sides of the holding compartment 3 in the vehicle width direction VW, that is, the left side and right side. As shown in FIG. 1 to FIG. 3, the body frame 60 extends generally in the vehicle length direction VL. In the embodiment shown in FIG. 1 to FIG. 3, the body frame 60 has a part at the inside in the vehicle length direction VL, that is, a rear side part 60*r*, a part at the outside of the vehicle length direction VL, that is, a front side part 60*f*, and an intermediate part 60*i* connecting these rear side part 60*r* and front side part. 60*f* together. The rear side part 60*r* extends in the substantially horizontal direction while the front side part 60*f* extends in the substantially horizontal direction at a position higher than the rear side part 60*r* in the vehicle height direction VH.

Further, a suspension member 61 is arranged at the bottom part of the holding compartment 3. The part of the suspension member 61 at the outside in the vehicle length direction VL, that is, the front side part 61*f*, is fastened with the bottom surface of the front side part. 60*f* of the body frame 60 through a front side fastening structure 62*f*. The front side fastening structure 62*f* includes holes formed at a front side part 60*f* of the body frame 60 and a front side part 61*f* of the suspension member 61. By passing bolts 63*f* through these holes, the front side part 60*f* of the body frame 60 and the front side part 61*f* of the suspension member 61 are fastened together. Further, the part of the suspension member 61 at the inside in the vehicle length direction VL, that is, the rear side part 61*r*, is fastened to the bottom surface of the rear side part 60*r* of the body frame 60 through a rear side fastening structure 62*r*. The rear side fastening structure 62*r* includes holes formed at the rear side part 60*r* of the body frame 60 and the rear side part 61*r* of the suspension member 61. By passing bolts 63*r* through these holes, the rear side part 60*r* of the body frame 60 and the rear side part 61*r* of the suspension member 61 are fastened together. Note that, in FIG. 2, 64 for example shows a rubber bush. In a not shown other embodiment, the suspension member 61 is fastened through a fastening structure to the side surface of the body frame 60.

On the suspension member 61, part of the above-mentioned fuel cell system A is supported. Explaining this specifically, part of the fuel cell stack 10 at the outside in the vehicle length direction VL, that is, the front side part 10*f*, is supported through a front side mount 11*f* at the front side part 61*f* of the suspension member 61. Further, the part of the fuel cell stack 10 at the inside in the vehicle length direction VL, that is, the rear side part 10*r*, is supported through a rear side mount 11*r* at the rear side part 61*r* of the suspension member 61. The rear side mount 11*r* supports the part of the fuel cell stack 10 at the inside in the vehicle length direction VL, so can be said to be an "inside mount". On the other hand, as shown in FIG. 3, the fuel cell stack 10 is supported on the suspension member 61 so as to be positioned at the substantial center in the vehicle width direction VW. Furthermore, on the fuel cell stack 10, the intercooler 42, compressor 43, air cleaner 44, etc. are supported through a mount (not shown).

In a not shown other embodiment, separate from the suspension member 61, a support member fastened to the body frame 60 is provided through the above-mentioned fastening structures 62*f*, 62*r*. The fuel cell stack 10 etc. are supported through the mount on the support member. Therefore, if referring to the above-mentioned suspension member 61 and support member all together as the "support frame", the fuel cell stack 10 is supported through the mount on the support frame.

As will be understood from FIG. 1 to FIG. 3, the fuel cell stack 10 is supported on the suspension member 61 at the front side of the rear side fastening structure 62*r* in the vehicle length direction.

Furthermore, in the embodiment shown in FIG. 1 to FIG. 3, the front side part 10*f* and rear side part 10*r* of the fuel cell stack 10 include end plates. The above-mentioned fuel cell units are stacked together between these end plates. In this case, the stacking direction 10*s* of the fuel cell units matches the direction connecting together the front side part 10*f* and rear side part 10*r*. Further, at the rear side part 10*r* of the fuel cell stack 10, the above-mentioned hydrogen gas exhaust pipe 36, air exhaust pipe 46, and cooling water feed pipe 51 are connected.

Referring further to FIG. 1 to FIG. 3, the fuel cell stack 10 is supported on the suspension member 61 so that the stacking direction 10s of the fuel cell stack 10 is slanted by exactly the slant angle SA with respect to the horizontal direction HR in the vertical plane. That is, the fuel cell stack 10 is supported on the suspension member 61 so that the rear side part 10r of the fuel cell stack 10 becomes lower than the front side part 10f of the fuel cell stack 10. In a not shown other embodiment, the fuel cell stack 10 is arranged so that the rear side part 10r of the fuel cell stack 10 and the front side part 10f of the fuel cell stack 10 become substantially the same height positions. In a not shown still other embodiment, the fuel cell stack 10 is arranged so that the rear side part 10r of the fuel cell stack 10 becomes higher than the front side part 10f of the fuel cell stack 10.

Figure 5:
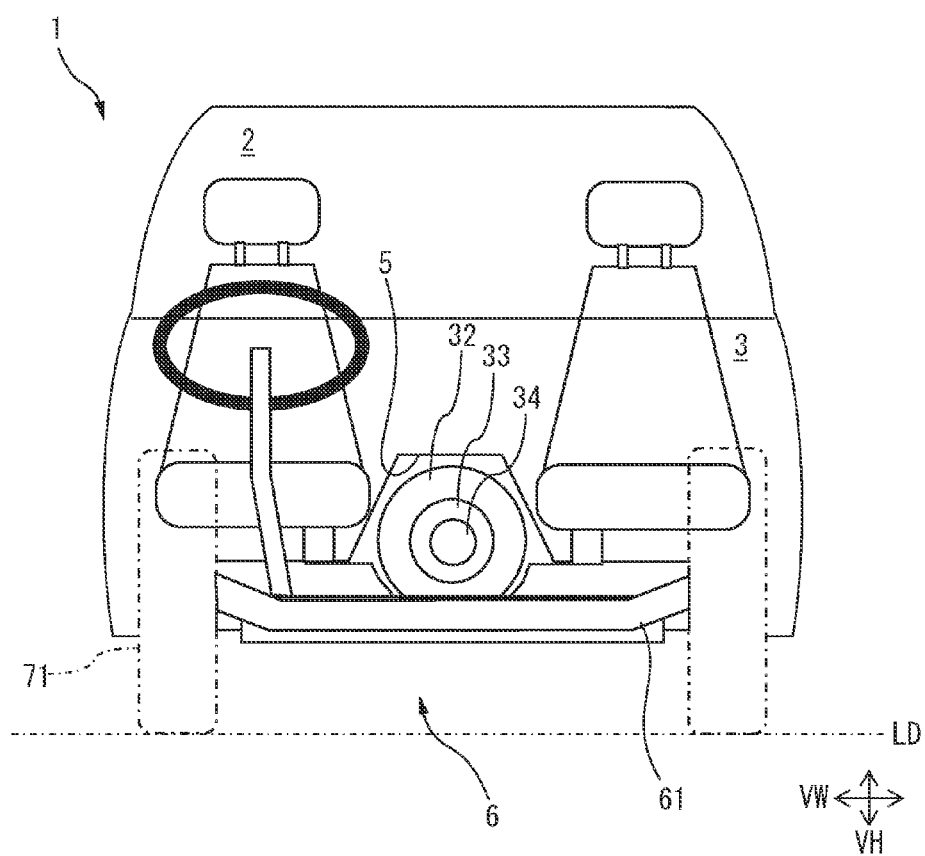
FIG. 5 is a partial front view of an electrically driven vehicle.

Referring to FIG. 5 in addition to FIG. 1 to FIG. 3, at the approximate center of the bottom part of the passenger compartment 2 in the vehicle width direction VW, a hydrogen tank compartment 5 extending in the vehicle length direction VL is formed. At the inside of the hydrogen tank compartment 5, a substantially columnar shaped hydrogen tank 32 is held. By doing this, in an electrically driven vehicle 1 carrying a fuel cell stack 10 in a holding compartment 3 at the front side in the vehicle length direction VL and carrying a motor-generator at another holding compartment (not shown) at the rear side, it is possible to provide a hydrogen tank compartment 5 with an extremely large capacity and therefore possible to carry a hydrogen tank 32 with an extremely large capacity.

As shown in FIG. 1 to FIG. 3 and FIG. 5, the hydrogen tank 32 is arranged in the hydrogen tank compartment 5 so that the main stop valve 33 is positioned at the front side of the vehicle length direction VL, that is, the holding compartment 3 side. As a result, it is possible to shorten the length of the hydrogen gas feed pipe 31 from the hydrogen tank 32 to the hydrogen gas injector 35. Therefore, safety is secured and the cost is reduced. Note that, in the embodiment shown in FIG. 1 to FIG. 3, the hydrogen tank 32 is a high pressure gas storage tank. The hydrogen tank 32 is a liquefied hydrogen tank in a not shown other embodiment. Furthermore, it is a so-called cryo-compressed hydrogen tank in another embodiment.

In particular, as shown in FIG. 1, above the suspension member 61 in the vehicle height direction VH, a steering gear 74 connected to a steering wheel 73 through a steering shaft 72, a wheel axle 75 connected to the wheels 71, and a front stabilizer 76 are arranged. In this case, the fuel cell stack 10 is arranged directly above these steering gear 74, wheel shaft 75, and front stabilizer 76. That is, the fuel cell stack 10 is arranged at a low position in the holding compartment 3 in the vehicle height direction VH. Due to this, the electrically driven vehicle 1 becomes low in center of gravity and smooth vehicle turning performance and good drivability can be secured.

Further, as shown in FIG. 3, the steering shaft 72 is arranged at one side of the fuel cell stack 10, for example, the right side, from the center line VC extending through the center of the vehicle width direction VW in the vehicle length direction VL. In other words, in the embodiment shown from FIG. 1 to FIG. 3, the electrically driven vehicle is a so-called right hand-drive car.

By the way, when the fuel cell stack 10 should generate power, the main stop valve 33 and hydrogen gas injector 35 are opened and hydrogen gas is supplied to the fuel cell stack 10. Further, the compressor 43 is driven and air is supplied to the fuel cell stack 10. As a result, in the fuel cell unit, an electrochemical reaction ($H_2 \rightarrow 2H^+ + 2e^-$, $(\frac{1}{2})O_2 + 2H^+ + 2e^- \rightarrow H_2O$) occurs and electrical energy is generated. The thus generated electrical energy is sent to a motor-generator (not shown.). As a result, the motor-generator is operated as an electric motor for driving the vehicle whereby the electrically driven vehicle is driven. On the other hand, for example, when braking the vehicle, the motor-generator is operated as an electric generator. The electrical energy generated at this time is stored in an accumulator.

Note that, in the embodiment shown in FIG. 1 to FIG. 3, the motor-generator is not held in the holding compartment 3 but is held in another holding compartment (not shown) formed at the rear side of the passenger compartment 2 in the vehicle length direction VL. In a not shown other embodiment, the motor-generator is held in the holding compartment 3.

In a not shown other embodiment, the fuel cell stack 10 is held inside a holding compartment formed at the rear side of the passenger compartment 2 in the vehicle length direction VL. Therefore, if expressed comprehensively, the fuel cell stack 10 is held inside the holding compartment formed at the outside of the passenger compartment 2 in the vehicle length direction VL.

Furthermore, in the embodiment shown in FIG. 1 to FIG. 3, a shelter space 6 into which the fuel cell stack 10 can enter is formed between the passenger compartment 2 and holding compartment 3 and the road surface ID, that is, between the hydrogen tank compartment 5 and holding compartment 3 and road surface LD.

Now then, if the electrically driven vehicle 1 collides with something at its front end part 1a, a collision load acts inward on the electrically driven vehicle 1 in the vehicle length direction VL that is, rearward. In the embodiment shown in FIG. 1 to FIG. 3, the front side mount 11f is connected to the fuel cell stack 10 and suspension member 61 so that when this rearward collision load is larger than a preset upper limit value, that is, when a serious vehicle collision occurs, the front side mount 11f does not separate from the fuel cell stack 10 and suspension member 61, while the rear side mount 11r is connected to the fuel cell stack 10 and suspension member 61 so that the rear side mount 11r separates from the suspension member 61 without separating from the fuel cell stack 10. As a result, if a serious vehicle collision occurs, the fuel cell stack 10 and rear side mount 11r move rearward in the vehicle length direction VL. Next, the fuel cell stack 10 and rear side mount 11r, or only the rear side mount 11r, strikes the rear side fastening structure 62r.

Figure 6:
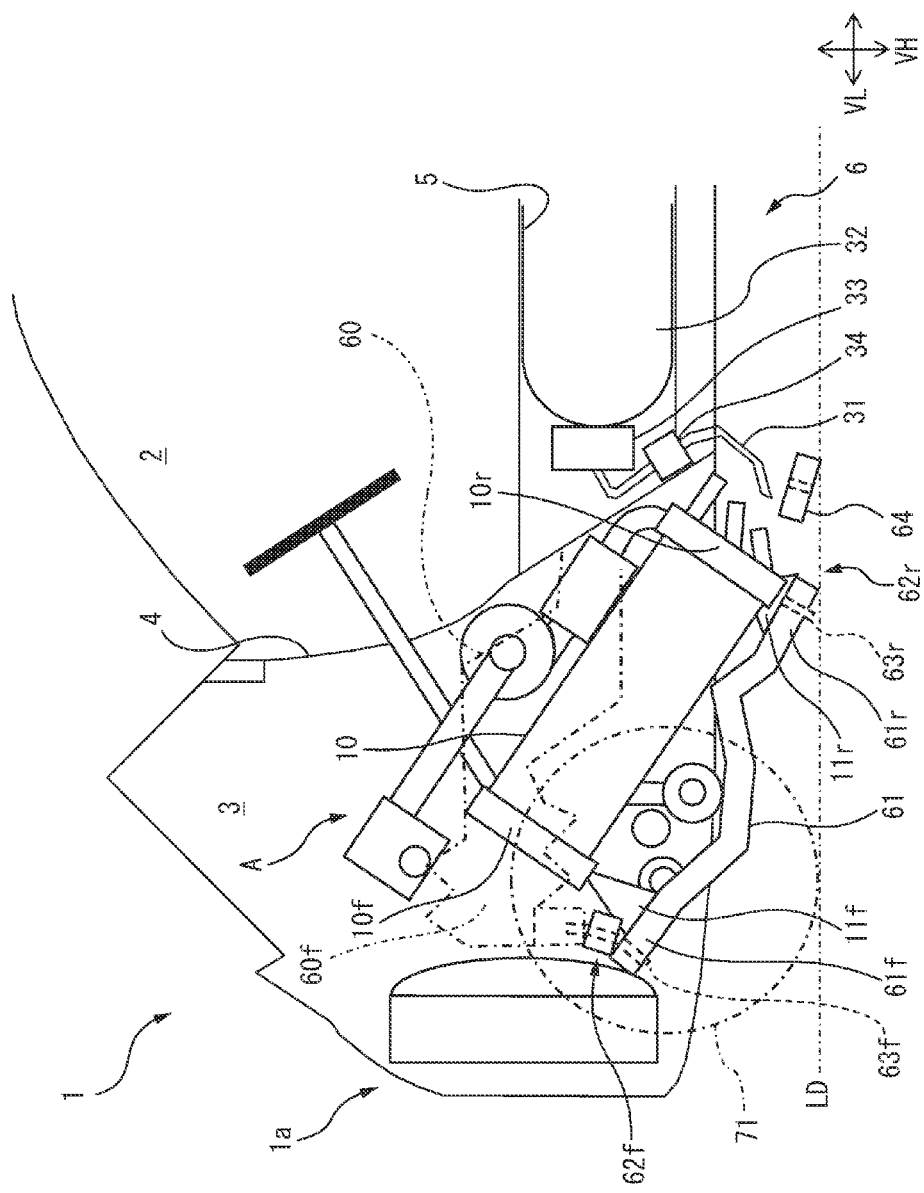
FIG. 6 is a partial side view of an electrically driven vehicle at the time of a serious vehicle collision.

On the other hand, in the embodiment shown in FIG. 1 to FIG. 3, the rear side fastening structure 62r is formed so as to break when a serious vehicle collision causes the fuel cell stack 10 and rear side mount 11r to strike the rear side fastening structure 62r. That is, for example, the rear side fastening structure 62r is broken by the bolts 63r breaking or the bolts 63r detaching from the holes in the body frame 60 or holes in the suspension member 61. If the rear side fastening structure 62 breaks, the rear side part 61r of the suspension member 61 and the body frame 60 separate from each other. On the other hand, even if serious vehicle collision occurs, the front side fastening structure 62f does not break. Therefore, if serious vehicle collision occurs, the rear side part 61r of the suspension member 61 separates from the body frame 60 while the front side part 61f of the suspension member 61 remains fastened to the body frame 60. As a result, due to the weights of the fuel cell stack 10 and suspension member 61, the rear side part 10r of the fuel cell stack 10 moves together with the rear side part 61r of the suspension member 61 downward in the vehicle height direction VH. Therefore, as shown in FIG. 6, the fuel cell stack 10 as a whole moves rearward while the rear side part 10r moves downward. In this way, the fuel cell stack 10 moves toward the shelter space 6 and enters the inside of the shelter space 6.

As a result, at the time of a serious vehicle collision, the fuel cell stack 10 is prevented from striking the dashboard. 4 and therefore is prevented from entering inside the passenger compartment 2. Further, even if the rearward collision load becomes further larger, the fuel cell stack 10 advances through the inside of the shelter space 6 below the hydrogen tank compartment 5 and therefore the fuel cell stack 10 is reliably prevented from entering inside the passenger compartment 2. Note that, in the example shown in FIG. 6, serious vehicle collision causes the body frame 60 to deform so as to be shortened in the vehicle length direction VL. Further, in the embodiment shown in FIG. 1 to FIG. 3, an air bag (not shown) provided inside the passenger compartment 2 is deployed when it is judged that a serious vehicle collision has occurred, while the air bag is not deployed when it is judged that a serious vehicle collision has not occurred.

Further, since the fuel cell stack 10 enters the shelter space 6 at the time of a serious vehicle collision, the fuel cell stack 10 can be kept from striking the hydrogen tank 32 and main stop valve 33. As a result, leakage of hydrogen gas due to damage to the hydrogen tank 32 and main stop valve 33 and ignition and explosion of the hydrogen gas are prevented.

As explained above, in the embodiment shown in FIG. 1 to FIG. 3, the fuel cell stack 10 is arranged so that the stacking direction 10s of the fuel cell stack 10 is slanted from the horizontal direction HR by exactly the slant angle SA. For this reason, compared with when the fuel cell stack 10 is arranged so that the stacking direction 10s of the fuel cell stack 10 becomes substantially the horizontal direction, at the time of a serious vehicle collision, the fuel cell stack 10 can move downward and enter the shelter space 6 more quickly. Therefore, the fuel cell stack 10 can be more reliably prevented from entering the inside of passenger compartment 2 or striking the hydrogen tank 32 etc. In this case, the slant angle SA of the fuel cell stack 10 is preferably 1 to 30°, more preferably 16 to 20°.

Note that, if a power generation action is performed at the fuel cell stack 10, water is generated in the fuel cell stack 10. This water is discharged through the hydrogen gas exhaust pipe 36 and air exhaust pipe 46 from the fuel cell stack 10. Therefore, if making the fuel cell stack 10 slant as explained above, it is possible to discharge water well from the fuel cell stack 10. Further, if making the fuel cell stack 10 slant, a worker can more easily access the fuel cell stack 10 during work for mounting the fuel cell stack 10 in the vehicle or inspection and maintenance.

In a not shown other embodiment, the front side mount 11f is connected to the fuel cell stack 10 and suspension member 61 so that the front side mount 11f separates from the fuel cell stack 10 or suspension member 61 at the time or a serious vehicle collision.

Further, in a not shown other embodiment, the rear side mount 11r is connected to the fuel cell stack 10 and suspension member 61 so that the rear side mount 11r separates from the fuel cell stack 10 without separating from the suspension member 61 at the time of a serious vehicle collision. In this case, the rear side mount 11r does not strike the rear side fastening structure 62r. Only the fuel cell stack 10 is struck. In a not shown still other embodiment, the rear sole mount 11r is connected to the fuel cell stack 10 and suspension member 61 so that the rear side mount 11r separates from the suspension member 61 and fuel cell stack 10 at the time of a serious vehicle collision.

Furthermore, in a not shown other embodiment, the front side fastening structure 62f is formed to break at the time of a serious vehicle collision. In this case, at the time of a serious vehicle collision, the fuel cell stack 10 is separated from the body frame 60 together with the suspension member 61. On this point, in the embodiment shown in FIG. 1 to FIG. 3, even if a serious vehicle collision occurs, it can be said that the fuel cell stack 10 continues to be connected to the body frame 60.

Furthermore, in a not shown other embodiment, a fuel cell stack 10 is supported on the suspension member 61 at for example the intermediate part of the front side part 10f and rear side part 10r of the fuel cell stack 10.

Figure 7:
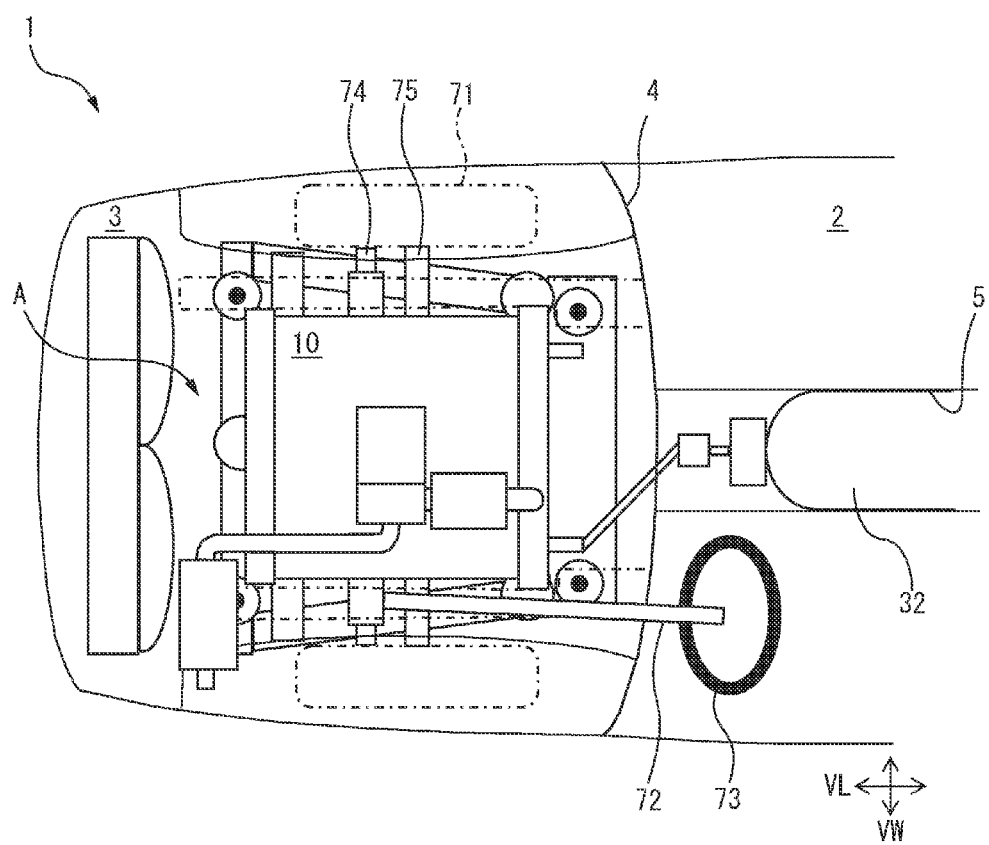
FIG. 7 is a partial side view of an electrically driven vehicle of another embodiment.

Next, referring to FIG. 7, another embodiment according to the present invention will be explained. In the embodiment shown in FIG. 7, the steering shaft 72 is arranged at the other side of the fuel cell stack 10, for example, the left side, from the center line VC extending through the center of the vehicle width direction VW in the vehicle length direction VL. In other words, in the embodiment shown in FIG. 7, the electrically driven vehicle is a so-called left hand-drive car. As explained above, the fuel cell stack 10 is supported on the suspension member 61 so as to be positioned at the substantial center in the vehicle width direction VW. As a result, both when the steering shaft 72 is arranged at the right side and arranged at the left side, the fuel cell stack 10 will not interfere with the steering shaft 72. As a result, by just changing the position of arrangement of the steering shaft 72, it is possible to construct a right hand-drive car and left hand-drive car. As a result, when developing and producing both a right hand-drive car and left hand-drive car, it is possible to reduce the cost required for evaluation of the drivability and safety or possible to use the same parts for a right hand-drive car and left hand-drive car.

REFERENCE SIGNS LIST

2. passenger compartment
3. holding compartment
6. shelter space
10. fuel cell stack
11r. rear side mount
60. body frame
61. suspension member
62f, 62r, fastening structure
LD. road surface

What is claimed is:
1. An electrically driven vehicle comprising:
  a body frame arranged in a holding compartment that is formed outside and in front of a passenger compartment in a vehicle length direction, the vehicle length direction extends from a front to a rear of the vehicle;
  a support frame fastened to the body frame in the holding compartment through a fastening structure; and
  a fuel cell stack configured to generate electric power by an electrochemical reaction between a fuel gas and oxidant gas, which fuel cell stack supported on the support frame through a plurality of mounts located inside of the holding compartment, wherein
  the plurality of mounts include a rear mount supporting a part of the fuel cell stack at the rear of the holding compartment in the vehicle length direction and a front mount supporting a part of the fuel cell stack at the front of the holding compartment in the vehicle length direction, a shelter space in which the fuel cell stack can enter is formed between the passenger compartment and the holding compartment and a road surface, and, at the time of a serious vehicle collision when a collision load applied to the vehicle inward in the vehicle length direction is larger than a preset upper limit value, the part of the fuel cell stack at the rear in the vehicle length direction separates from the rear mount or the rear mount separates from the support frame so that the part of the fuel cell stack at the rear of the holding compartment in the vehicle length direction or the rear mount is moved inward in the vehicle length direction and strikes the fastening structure whereby the fastening structure breaks and thereby the support frame separates from the body frame and the fuel cell stack moves downward and heads toward a rear of the shelter space.

2. The electrically driven vehicle according to claim 1, wherein a fuel gas tank chamber is formed at a bottom part of the passenger compartment and a fuel gas tank is held in the fuel gas tank compartment and, therefore, the shelter space is formed between the holding compartment and the fuel gas tank chamber and road surface, and, at the time of the serious vehicle collision, the fuel cell stack moves toward a rear of the shelter space.

3. The electrically driven vehicle according to claim 1, wherein the fuel cell stack is supported on the support frame so that the part of the fuel cell stack at the rear of the holding compartment in the vehicle length direction becomes lower than the part of the fuel cell stack at the front of the holding compartment in the vehicle length direction.

4. The electrically driven vehicle according to claim 3, wherein the fuel cell stack is provided with a fuel gas exhaust pipe and oxidant gas exhaust pipe for taking out excess fuel gas and excess oxidant gas from the fuel cell stack and wherein at least one of these fuel gas exhaust pipe and oxidant gas exhaust pipe is connected to a part of the fuel cell stack at the rear of the holding compartment in the vehicle length direction.

5. The electrically driven vehicle according to claim 1, wherein the part of the fuel cell stack at the rear of the holding compartment in the vehicle length direction is supported through the rear mount on the support frame.

* * * * *